US011810366B1

(12) United States Patent
Wang et al.

(10) Patent No.: US 11,810,366 B1
(45) Date of Patent: Nov. 7, 2023

(54) JOINT MODELING METHOD AND APPARATUS FOR ENHANCING LOCAL FEATURES OF PEDESTRIANS

(71) Applicant: ZHEJIANG LAB, Hangzhou (CN)

(72) Inventors: Hongsheng Wang, Hangzhou (CN); Guang Chen, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/072,002

(22) Filed: Nov. 30, 2022

Related U.S. Application Data

(63) Continuation of application No. PCT/CN2022/124009, filed on Oct. 9, 2022.

(30) Foreign Application Priority Data

Sep. 22, 2022 (CN) .......................... 202211155651.9

(51) Int. Cl.
*G06V 20/58* (2022.01)
*G06V 10/82* (2022.01)

(52) U.S. Cl.
CPC .............. *G06V 20/58* (2022.01); *G06V 10/82* (2022.01)

(58) Field of Classification Search
CPC ................................ G06V 20/58; G06V 10/82
See application file for complete search history.

(56) References Cited

U.S. PATENT DOCUMENTS

| 2018/0150704 | A1 | 5/2018 | Lee et al. | |
|---|---|---|---|---|
| 2020/0047747 | A1* | 2/2020 | An | B60W 10/18 |
| 2020/0310433 | A1* | 10/2020 | Mukherjee | G05D 1/0088 |
| 2021/0201010 | A1* | 7/2021 | Shao | G06V 10/82 |

(Continued)

FOREIGN PATENT DOCUMENTS

| CN | 111368815 A | 7/2020 |
|---|---|---|
| CN | 111507217 A | 8/2020 |

(Continued)

OTHER PUBLICATIONS

Chen Yong et al. "Occluded Pedestrian Detection Based on Joint Attention Mechanism of Channel-wise and Spatial Information." Journal of Electronics and Information Technology. vol. 42, No. 6. Jun. 30, 2020.

(Continued)

*Primary Examiner* — Ming Y Hon
(74) *Attorney, Agent, or Firm* — IPRO, PLLC

(57) ABSTRACT

Disclosed are a joint modeling method and apparatus for enhancing local features of pedestrians. The method includes the following steps: S1: acquiring an original surveillance video image data set, dividing the original surveillance video image data set into a training set and a test set in proportion; S2: cutting the surveillance video image training set to obtain image block vector sequences. In the present disclosure, local features of pedestrians in video images are extracted by a multi-head attention neural network, weight parameters of image channels are learned by channel convolution kernels, spatial features on the images are scanned through spatial convolution, local features of pedestrians are enhanced to improve the recognition rate of pedestrians, a feed-forward neural network and an activation function are adopted, so as to realize pedestrian re-recognition, thereby obtaining face images available.

7 Claims, 7 Drawing Sheets

(56) References Cited

U.S. PATENT DOCUMENTS

| | | | | |
|---|---|---|---|---|
| 2022/0036579 A1* | 2/2022 | Liang | ................... | G06T 7/73 |
| 2022/0207337 A1* | 6/2022 | Kim | ................... | G06N 3/063 |
| 2022/0366177 A1* | 11/2022 | Park | ................... | G06V 20/58 |
| 2022/0366218 A1* | 11/2022 | Parisotto | ................... | G06N 3/044 |
| 2023/0082173 A1* | 3/2023 | Li | ................... | G06N 3/044 |
| | | | | 713/168 |

FOREIGN PATENT DOCUMENTS

| | | |
|---|---|---|
| CN | 111539370 A | 8/2020 |
| CN | 12818931 A | 5/2021 |
| CN | 112836646 A | 5/2021 |
| CN | 113221625 A | 8/2021 |
| CN | 113516012 A | 10/2021 |
| CN | 113723366 A | 11/2021 |
| CN | 114783003 A | 7/2022 |

OTHER PUBLICATIONS

Hao Xia et al. "Pedestrian detection algorithm based on multi-scale feature extraction and attention feature fusion." Digital Signal Processing. No. 121. Mar. 31, 2022. DOI:10.1016/j.dsp.2021.103311.

\* cited by examiner

JOINT MODELING METHOD AND APPARATUS FOR ENHANCING LOCAL FEATURES OF PEDESTRIANS

CROSS-REFERENCE TO RELATED APPLICATIONS

The present disclosure claims priority of Chinese patent application No. CN202211155651.9 entitled "Joint Modeling Method and Apparatus for Enhancing Local Features of Pedestrians", filed to China National Intellectual Property Administration on Sep. 22, 2022, the entire contents of which are incorporated herein by reference.

TECHNICAL FIELD

The present disclosure relates to the field of computer vision, and in particular to a joint modeling method and apparatus for enhancing local features of pedestrians.

BACKGROUND

Pedestrian re-recognition is a technology that uses computer vision to detect and recognize the presence of particular pedestrians in a surveillance video or image. There are differences in posture, appearance and shooting distance of pedestrians under different cameras. Generally, there are differences in posture, appearance, distance and definition of pedestrians photographed by cameras. In most cases, it is impossible to obtain face images available, resulting in impossibility of recognizing pedestrians. Therefore, in most situations that cannot obtain face images available, a joint modeling method and apparatus for enhancing local features of pedestrians, as well as the pedestrian re-recognition technology, are used to realize pedestrian recognition and tracking, which are widely used in the field of video surveillance and security protection.

SUMMARY

It is an object of the present disclosure to provide a computer-implemented joint modeling method and apparatus for enhancing local features of pedestrians, so as to overcome shortcomings in the prior art.

In order to achieve the above object, the present disclosure provides the following technical solutions.

The present disclosure provides a computer-implemented joint modeling method for enhancing local features of pedestrians, including the following steps:

S1: acquiring an original surveillance video image data set, dividing the original surveillance video image data set into a training set and a test set in proportion;

S2: cutting the surveillance video image training set to obtain image block vector sequences;

S3: constructing a multi-head attention neural network, inputting the image block vector sequences into the multi-head attention neural network and extracting the local image features of pedestrians;

S4: constructing an enhanced channel feature neural network, inputting the images into the enhanced channel feature neural network and capturing differential features among image channels of pedestrians by using three-channel image convolution;

S5: constructing an enhanced spatial feature neural network, inputting the images into the enhanced channel feature neural network and obtaining image spatial differential features of pedestrians with scanning by using spatial convolution;

S6: interactively concatenating the local image features of pedestrians in the multi-head attention neural network, the differential features among image channels of pedestrians in the enhanced channel feature neural network, and the image spatial differential features of pedestrians in the enhanced spatial feature neural network, constructing a joint model to enhance the local image features of pedestrians;

S7: inputting the enhanced local image features of pedestrians into a feed-forward neural network to recognize pedestrians in the images; and S8: iteratively training the neural network obtained by joint modeling to obtain a joint model for pedestrian re-recognition joint model for pedestrian re-recognition and recognize the pedestrians.

Preferably, in the step S1, the original surveillance video image data set includes an image labeled sample, a coordinate file of the image labeled sample, and an unlabeled sample.

Preferably, the step S2 includes the following sub-steps:

S21: segmenting the surveillance video images on the basis of the number of channels of the images to obtain image blocks;

S22: converting the heights and widths of the image blocks into a fixed input size of the multi-head attention neural network; and S23: tiling the image blocks into sequences to obtain the image block vector sequences.

Preferably, the lengths of the image block vector sequences are equal to the sizes multiplied by the heights multiplied by the widths of the images, the image block vector sequences contain position coordinates of the image blocks, and the sequences are converted into matrices, which are used as inputs to the multi-head attention neural network.

Preferably, S31: calculating a single attention: with regard to a query matrix, a key matrix and a value matrix present in each of the image block vector sequences in the step S3, obtaining an attention score matrix by matrix multiplying the query matrix and the key matrix, applying the attention score matrix to the value matrix, after matrix multiplication of the two matrices, obtaining the single attention through an activation function.

S32: constructing a multi-head attention: with regard to the image block vector sequences, calculating a single attention from each of the image block vector sequences respectively, and conducting interactive calculation on the single attentions calculated from each of the image block vector sequences to obtain the multi-head attention; and S33: extracting local image features of pedestrians by using the multi-head attention: inputting the image block vector sequences into the constructed multi-head attention neural network, calculating local self-attention of pixels of each of the images to the pixels of adjacent images by using a local multi-head self-attention mechanism, and extracting the local image features of pedestrians through parallel matrix multiplication.

Preferably, the step S4 includes the following sub-steps:

S41: with regard to the three channels of the input images, constructing a three-channel enhanced image convolutional neural network which includes three convolution kernels, wherein the three conventional kernels correspond to the three channels of the images, respectively;

S42: allowing the three convolution kernels to learn weight parameters of corresponding image channels respectively, and to output three groups of different weight parameters; and S43: allowing the three convolution kernels to calculate independently, and to learn differential parameter weights among the three channels, so as to obtain feature space maps of the three channels, calculating interactively the three channels to obtain image channel features of pedestrians.

Preferably, the step S5 includes the following sub-steps:

S51: defining a two-dimensional convolution spatially dividing the two-dimensional convolution into two sub-convolution kernels; and S52: scanning image spatial features respectively by using the two sub-convolution kernels, so as to obtain two spatial features, then obtaining the image spatial differential features of pedestrians by matrix multiplication.

Preferably, the step S6 includes the following sub-steps:

S61: an interactive concatenation of the enhanced channel feature neural network and the multi-head attention neural network: firstly, the output of the convolutional network going through a global average pooling layer, using a first-layer three-channel convolution to learn weight parameters among the image channels, using a second-layer three-channel convolution to transform dimensionality after undergoing a first-layer activation function, and finally converting feature values into probability distribution through the activation function and inputting the probability distribution into the multi-head self-attention branch for calculation;

S62: an interactive concatenation of the multi-head attention neural network and the enhanced channel feature neural network: the output of the calculation for multi-head attention going through the first-layer three-channel convolution, learning different weight parameters among the three channels, converting the number of channels of the images into one, going through the second-layer three-channel convolution after undergoing the first-layer activation function, reducing the learned weight parameters, undergoing a second-layer activation function to become probability distribution in a spatial dimension, which is used as the output in the enhanced channel feature convolutional network branch;

S63: an interactive concatenation of the enhanced spatial feature neural network and the enhanced channel feature neural network: the two sub-convolutions of the two-dimensional convolution of the enhanced spatial feature neural network outputting a multi-dimensional convolutional spatial feature matrix of pedestrians, which is converted into a two-dimensional spatial feature matrix that, after undergoing matrix multiplication and activation function, is used as the output of the enhanced channel feature neural network; and S64: inputting the output of multi-head attention, the output of enhanced channel feature convolution and the output of spatial convolution into a multi-layer perceptron, where the local image features of pedestrians are mapped to parallel branches through the linear layer to conduct feature fusion calculation, so as to obtain the enhanced local image features of pedestrians.

Preferably, the step S7 includes the following sub-steps:

S71: adopting the feed-forward neural network and the activation function, inputting the obtained enhanced local image features of pedestrians into the feed-forward neural network, allowing it to go through linear layer transformation, and mapping the probability distribution of pedestrians into categories to recognize pedestrians by using the activation function; and S72: calculating an intersection ratio of coordinates of the recognized pedestrians and the image labeled sample in the original surveillance video image data set, and calculating an accuracy rate and a recall rate, where the accuracy rate refers to the recognized pedestrians, indicating a proportion of real pedestrians in the sample predicted to be positive, and the recall rate refers to the image labeled sample in the original surveillance video image data set, indicating a proportion of correctly recognized pedestrians in the positive examples in the sample.

Preferably, the step S8 includes the following sub-steps:

S81: by using a residual connection mode for the neural network obtained by joint modeling, accelerating model convergence, performing an iterative training, and adjusting training parameters, so as to obtain the joint model for pedestrian re-recognition; and S82: inputting the original surveillance video image test set into the joint model for pedestrian re-recognition trained in the step S81 for prediction, and box-selecting pedestrians in the images, so as to realize pedestrian re-recognition.

The present disclosure provides a computer-implemented joint modeling apparatus for enhancing local features of pedestrians, including the following modules:

a module for acquiring an video image sample set, configured to acquire an original surveillance video image data set;

a module for image segmentation, configured to obtain image blocks by performing image segmentation according to channels;

a module for extracting local image features of pedestrians, configured to construct a multi-head attention neural network to extract local image features of pedestrians;

a module for capturing differential features among image channels of pedestrians, configured to construct an enhanced channel feature neural network to capture differential features among image channels of pedestrians by using a convolutional neural network;

a module for scanning image spatial differential features of pedestrians, configured to construct an enhanced spatial feature neural network to scan image spatial differential features of pedestrians;

a module for enhanced local image features of pedestrians, configured to interactively concatenate the local image features of pedestrians in the multi-head attention neural network, the differential features among image channels of pedestrians in the enhanced channel feature neural network, and the image spatial differential features of pedestrians in the enhanced spatial feature neural network, which are then jointly modeled;

a module for pedestrian recognition, configured to construct a feed-forward neural network, where the enhanced local image features of pedestrians go through linear transformation and are then mapped into a pedestrian probability output;

a module for model training, configured to iteratively train the neural network obtained by joint modeling and update model parameters until the model training converges, so as to obtain a joint pedestrian recognition model; and a module for pedestrian recognition in images, configured to input a test set into the joint pedestrian recognition model to recognize pedestrians.

The present disclosure provides a computer-implemented joint modeling apparatus for enhancing local features of pedestrians, including: a memory storing executable codes therein, and one or more processors that, when execute the executable codes, are configured to implement the joint modeling method for enhancing local features of pedestrians described above.

The present disclosure has the following beneficial effects: according to a computer-implemented joint modeling method and apparatus for enhancing local features of pedestrians of the present disclosure, local features of pedestrians in video images are extracted by a multi-head attention neural network, weight parameters of image channels are learned by channel convolution kernels, spatial features on the images are scanned through spatial convolution, local features of pedestrians are enhanced to improve the recognition rate of pedestrians, a feed-forward neural network and an activation function are adopted, where the enhanced local features of pedestrians are input into the feed-forward neural network and allowed to go through linear layer transformation, and the activation function is used to map the probability distribution of pedestrians into categories to recognize pedestrians, the position coordinates of pedestrians in the images are output and pedestrians are box-selected, so as to realize pedestrian re-recognition, thereby obtaining face images available.

DETAILED DESCRIPTION

In order to further make the objects, technical solutions, and advantages of the present disclosure more apparent, a detailed description of the present disclosure will be further rendered with reference to the drawings and embodiments. It should be understood, however, that the specific embodiments described herein are merely illustrative of the present disclosure and are not intended to limit the scope of the present disclosure. Further, in the following description, descriptions of well-known structures and techniques are omitted so as to avoid unnecessarily obscuring the concepts of the present disclosure.

Figure 1:
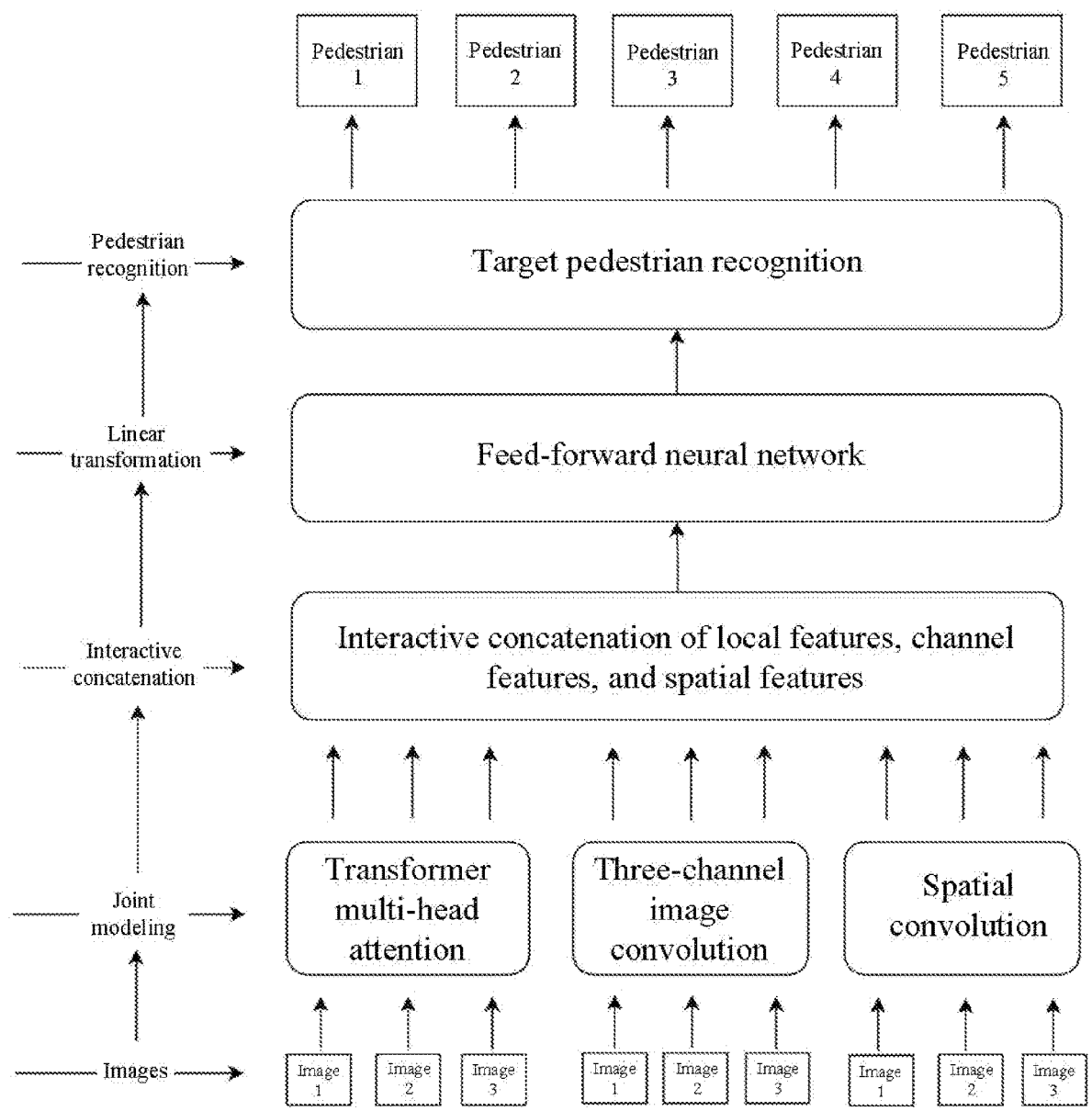
FIG. 1 is an overall flow diagram of an embodiment of the present disclosure.

Referring to FIG. 1, the present disclosure provides a computer-implemented pedestrian re-recognition method for enhancing joint modeling of local features of pedestrians, where video images are segmented into image blocks; the image block sequences are input into a multi-head attention neural network to extract local image features of pedestrians; the image blocks are input into a three-channel convolutional neural network to capture image channel features of pedestrians; an enhanced channel feature neural network is constructed to capture differential features among image channels of pedestrians; local features, image channel features, and spatial features are interactively concatenated and jointly modeled; the enhanced local image features of pedestrians are input into a feed-forward neural network to recognize pedestrians in the images; the multi-head attention neural network and the convolutional neural network are iteratively trained to obtain a joint model for pedestrian re-recognition; and a test set is input into the joint model for pedestrian re-recognition to output pedestrian recognition results. The use of the method and apparatus enables tracking and recognizing target pedestrians across surveillance videos and images of multiple cameras.

The present disclosure is described in detail with the following steps.

The present disclosure provides a computer-implemented joint modeling method for enhancing local features of pedestrians, where the overall process is divided into eight stages:

at a first stage, acquiring an original surveillance video image data set, then dividing the original surveillance video image data set into a training set and a test set in proportion;

at a second stage, surveillance video image segmentation: segmenting the original surveillance video image training set image on the basis of image channels to obtain image blocks;

at a third stage, extraction of local features of pedestrians from surveillance video images: extracting features from image blocks by using a multi-head attention neural network (Transformer);

at a fourth stage, capturing image channel features of pedestrians: using three-channel image convolution to capture image channel features;

at a fifth stage, scanning image spatial features of pedestrians: scanning image spatial features by using spatial convolution;

at a sixth stage, enhancing local image features of pedestrians: interactively concatenating local features, image channel features, and spatial features, then enhancing the local image features of pedestrians by using spatial convolution;

at a seventh stage, recognizing pedestrians in the images: adopting a feed-forward neural network and an activation function, inputting the obtained enhanced local image features of pedestrians into the feed-forward neural network, allowing it to go through linear layer transformation, and mapping the probability distribution of pedestrians into categories to recognize pedestrians by using the activation function to; and at an eighth stage, a joint model for pedestrian re-recognition, and pedestrian recognition: iteratively training the joint model for pedestrian re-recognition to obtain the joint model for pedestrian re-recognition and recognize the pedestrians.

Further, at the first stage, the original surveillance video image data set includes an image labeled sample, a coordinate file of the image labeled sample, and an unlabeled sample. The original surveillance video image data set may come from real-time captured video image data, local stored image data, or video data from communication network.

Further, the second stage specifically includes: obtaining the number of each of the video surveillance images in the training set by multiplying the height by the width by the number of channels of the image, and performing image segmentation according to the obtained number, each of the image blocks having a unique identifier; mapping image blocks with different sizes into a specified input size of the multi-head attention neural network by using linear transformation; tiling each of the image blocks having a unique identifier into a sequence to obtain image block sequences, where the lengths of the sequences are equal to the numbers multiplied by the heights multiplied by the widths of the image blocks, and the sequences contain position coordinates of the image blocks; and then converting the sequences into matrices, which are used as inputs to the multi-head attention neural network (Transformer).

Figure 2:
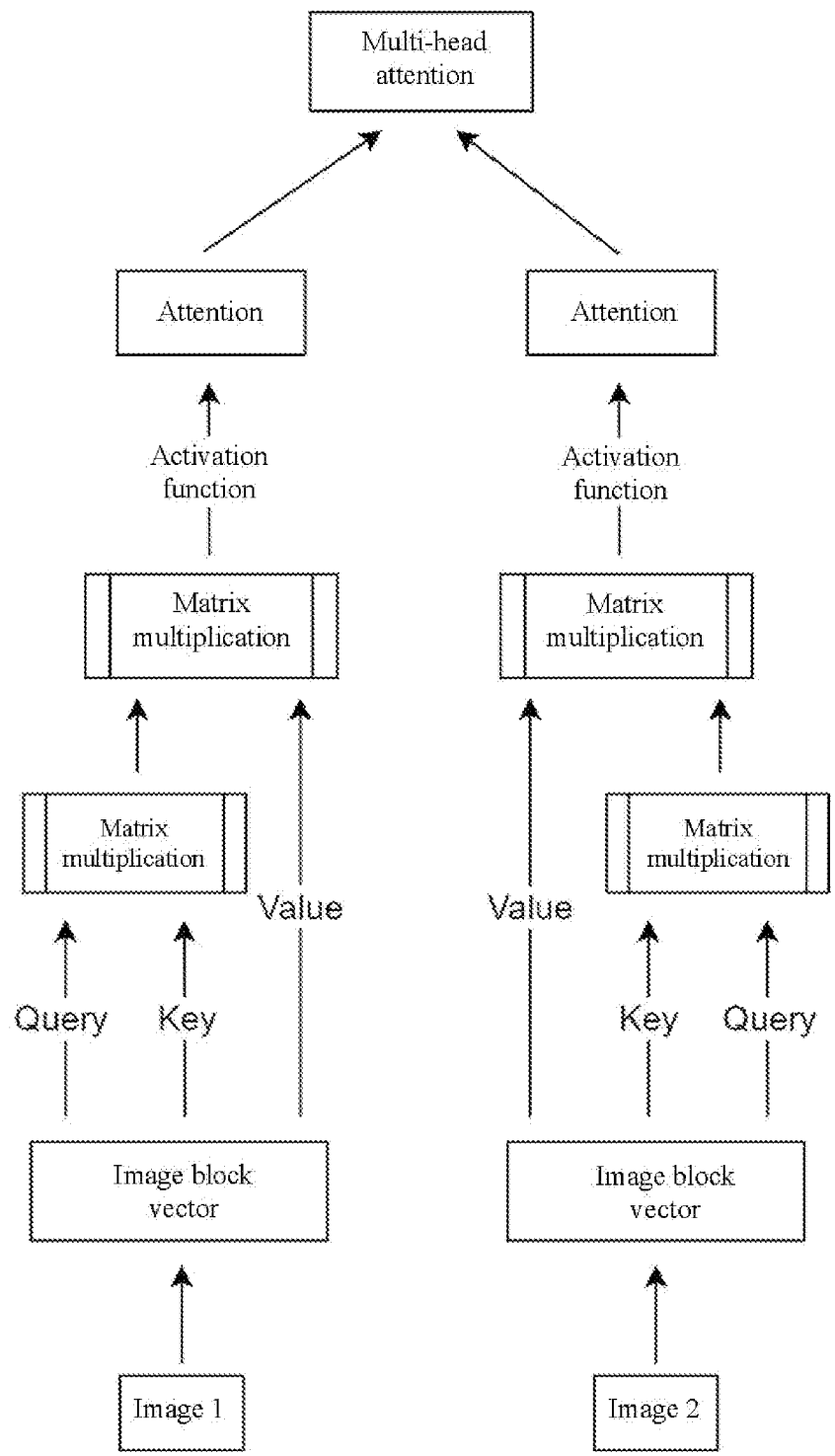
FIG. 2 is a schematic diagram of extraction of local features of pedestrians from surveillance video images of an embodiment of the present disclosure.

Further, the third stage specifically includes: inputting the matrix into the multi-head attention neural network (Transformer) for extraction of local image features of pedestrians, and referring to FIG. 2, the third stage includes the following sub-steps:

Step 1: firstly calculating a single attention: with regard to a query matrix, a key matrix and a value matrix present in each of the image block vector sequences, obtaining an attention score matrix by matrix multiplying the query matrix and the key matrix, applying the attention score matrix to the value matrix, after matrix multiplication of the two matrices, obtaining the single attention through an activation function; calculating a multi-head attention: with regards to the image block vector sequences, calculating a single attention from each of the image block vector sequences respectively, and conducting interactive calculation on the single attentions calculated from each of the image block vector sequences to obtain the multi-head attention; and Step 2: inputting the image block vector sequences into the multi-head attention neural network, calculating local self-attention of pixels of each of the images to the pixels of adjacent images, capturing the local image features of pedestrians through parallel matrix multiplication, where the calculation method is as follows:

1, inputting vector features Query, Key and Value into the multi-head layer, using $X=[x_1, x_2, x_3 \ldots x_n]$ to represent the input weight vectors, conducting matrix multiplication on Query and Key, and calculating the vector attention distribution through the activation function (Softmax);

2, Quey=Key=Value=X, calculating a multi-head attention weight through the activation function (Softmax);

3, $\alpha_i$=Softmax($s(k_i, q)$)=Softmax($s(x_i, q)$), where $\alpha_i$ is attention probability distribution and $s(x_i, q)$ is attention score;

4, calculating a single attention: Head=Attention(Quey, Key, Value);

5, multi-head attention:
Multihead(Quey, Key, Value)=Concat(Head$_1$, Head$_2$ . . . Head$_n$); where
Concat(Head$_1$, Head$_2$ . . . Head$_n$) represents a plurality of attention heads.

Figure 3:
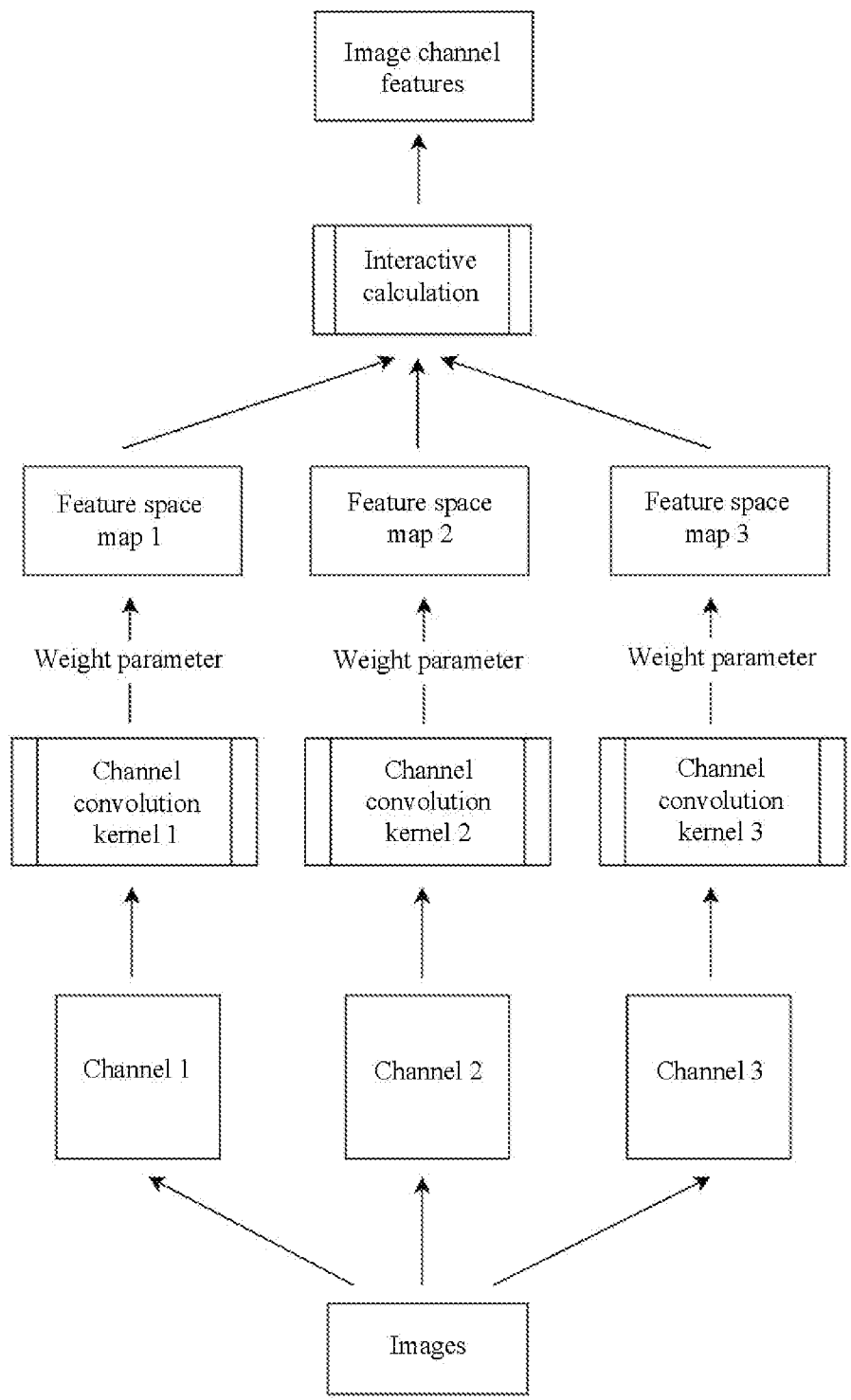
FIG. 3 is a schematic diagram of capturing image channel features of pedestrians of an embodiment of the present disclosure.

Further, the fourth stage specifically includes: inputting the images into the three-channel image convolutional neural network to capture image channel features of pedestrians, and referring to FIG. 3, the fourth stage is divided into the following sub-steps:

Step 1: with regard to the three channels of the input images, constructing a three-channel image convolutional neural network which includes three convolution kernels that correspond to the three channels of the images, respectively; allowing the three convolution kernels to learn weight parameters of corresponding image channels respectively, so as to output three groups of different weight parameters, each of the convolution kernels having a size of 1×1×3, where 3 is the number of channels of the input images; inputting the images into the three-channel image convolutional neural network, where the input images are weighted and combined in a convolution depth direction and, after going through the three convolution kernels of 1×1×3, output three local features which contain the weight parameters among the three channels, and the calculation formula is as follows:

$$O(i, j) = (K \times I)(i, j) = \sum_m \sum_n I(i+m, j+n)K(m, n);$$

where: $O(i,j)$ is an output matrix, I is an input matrix, K is a convolution kernel matrix, and the convolution kernel matrix K has a shape of m x n;
I(i+m,j+n)K(m,n)K(m,n) represents that elements of the input matrix I(i+m,j+n) are multiplied by elements of the kernel matrix K(m,n), and $$\sum_m \sum_n$$

is accumulated and summed in horizontal and vertical directions of the matrix, respectively; and Step 2: allowing the three convolution kernels to calculate independently, and to learn differential parameter weights among the three channels, and obtaining feature space maps of the three channels, which are then calculated interactively to obtain image channel features of pedestrians.

Figure 4:
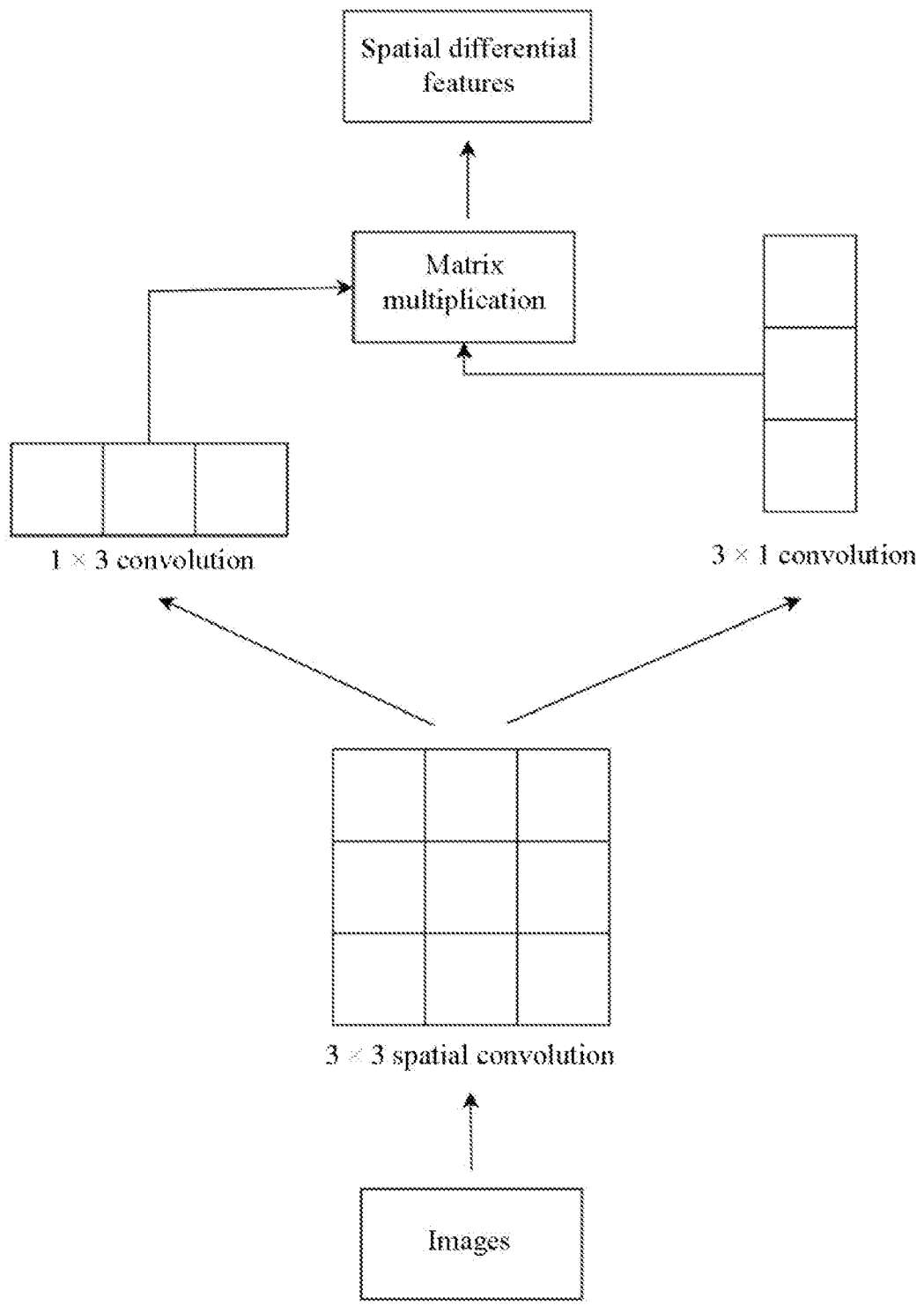
FIG. 4 is a schematic diagram of scanning image spatial features of pedestrians of an embodiment of the present disclosure.

Further, the fifth stage specifically includes: constructing an enhanced spatial feature neural network to scan image spatial differential features of pedestrians, and referring to FIG. 4, the fifth stage is divided into the following sub-steps:

Step 1: spatially dividing a two-dimensional convolution 3×3 into two sub-convolution kernels, where the first convolution kernel has a size of 3×1, and the second convolution kernel has a size of 1×3; and Step 2: scanning image spatial features respectively, so as to obtain two spatial feature maps, and matrix multiplying the two sub-convolution matrices to obtain the image spatial features.

Figure 5:
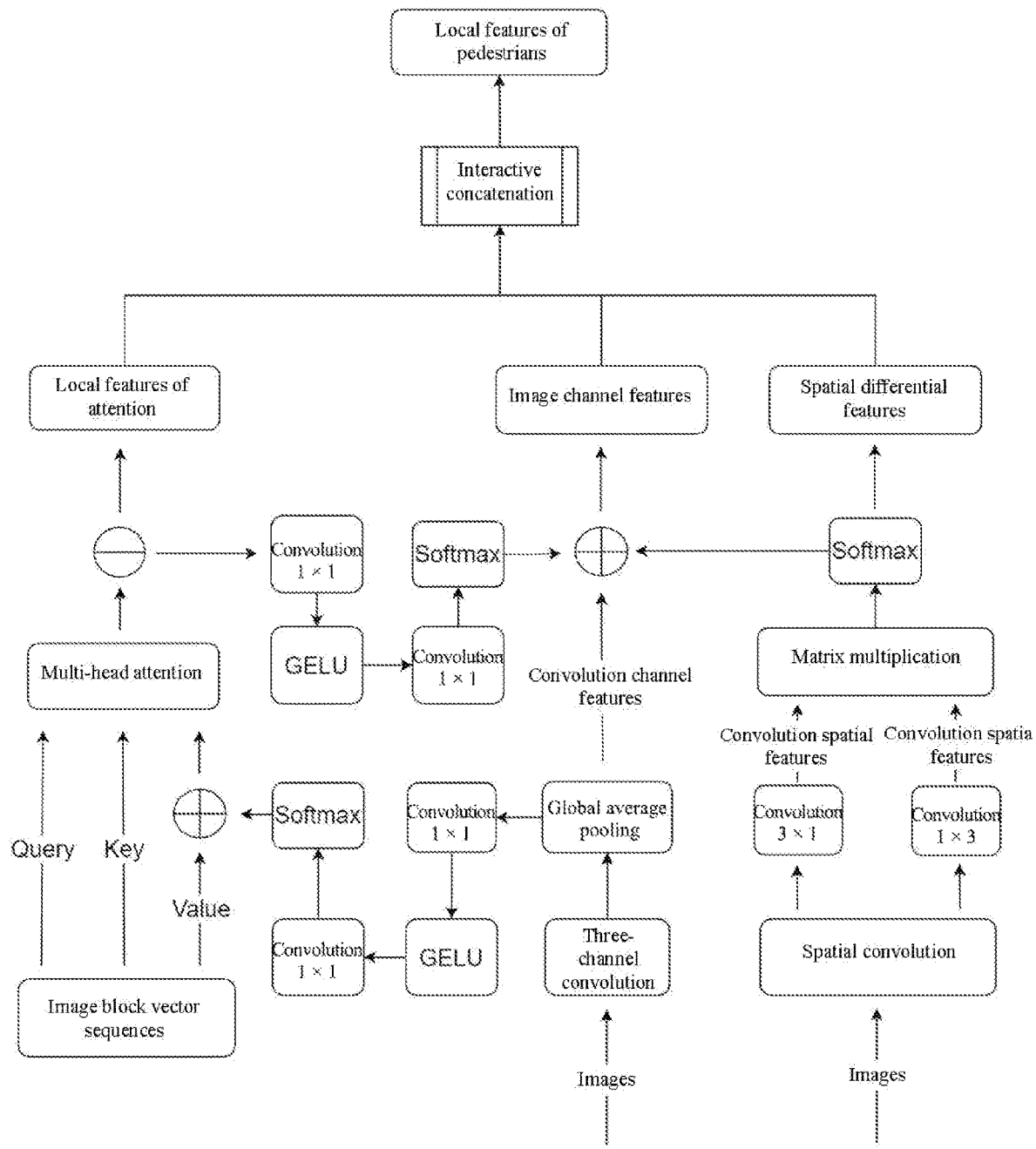
FIG. 5 is a schematic diagram of enhancing local image features of pedestrians of an embodiment of the present disclosure.

Further, the sixth stage specifically includes: interactively concatenating the output of the multi-head attention neural network, the output of the channel convolutional neural network, and the output of the enhanced spatial feature neural network, which are then jointly modeled, and referring to FIG. 5, the sixth stage is divided into the following sub-steps:

Step 1: an interactive concatenation of convolution and multi-head attention: the output of the convolutional network going through a global average pooling layer—first going through a first-layer three-channel convolution and using 1×1 convolution kernel to extract weight features among channels, and undergoing an activation function (GELU)—then going through a second-layer of 1×1 three-channel convolution to transform dimensionality to reduce parameters, and finally undergoing the activation function (Softmax) to convert feature values into probability distribution, and inputting the probability distribution as a multi-head self-attention Value for calculation;

Step 2: an interactive concatenation of multi-head attention and convolution branch: the output of the calculation for multi-head attention going through the first-layer three-channel 1×1 convolution, capturing local features, undergoing the activation function (GELU), and then going through the second-layer of 1×1 three-channel convolution to transform dimensionality to reduce parameters, converting the number of channels of the images into one, and after undergoing the activation function (Softmax), becoming probability distribution in a spatial dimension, which is used as the output in the convolution branch;

Step 3: an interactive concatenation of the enhanced spatial feature neural network and the enhanced channel feature neural network: the two sub-convolutions of the two-dimensional convolution of the enhanced spatial feature neural network outputting a multi-dimensional convolutional spatial feature matrix of pedestrians, which is converted into a two-dimensional spatial feature matrix that, after undergoing matrix multiplication and the activation function (Softmax), is used as the output of the enhanced channel feature neural network; and Step 4: inputting the output of multi-head attention, the output of channel convolution and the output of spatial convolution into a multi-layer perceptron, where the local image features of pedestrians are mapped to parallel branches through the linear layer to conduct feature fusion calculation, so as to obtain the enhanced local image features of pedestrians, and the calculation formula is as follows:

$$X=\text{Concat}(\text{LN}(x), W\text{-Loss}, \text{ConV})+x;$$

$$X'=\text{MLP}(\text{LN}(x'))+x'; \text{ where}$$

X is the output of multi-head attention, X' is the output of convolution, Concat is concatenation, W is a weight, Loss is a loss, ConV is a convolution, x and x' are feature vectors, LN is the linear layer, and MLP is the multi-layer perceptron.

Further, the seventh stage specifically includes: recognizing pedestrians in the images, and the seventh stage is divided into the following sub-steps:

Step 1: adopting the feed-forward neural network and the activation function (Softmax), inputting the obtained enhanced local image features of pedestrians into the feed-forward neural network, allowing it to go through linear layer transformation, and using the activation function (Softmax) to map the probability distribution of pedestrians into categories to recognize pedestrians; and Step 2: calculating an intersection ratio of coordinates of the recognized pedestrians and the image labeled sample in the original surveillance video image data set, and calculating an accuracy rate and a recall rate, where the accuracy rate refers to the recognized pedestrians, indicating a proportion of real pedestrians in the sample predicted to be positive, and the recall rate refers to the image labeled sample in the original surveillance video image data set, indicating a proportion of correctly recognized pedestrians in the positive examples in the sample.

Further, the eighth stage specifically includes: a joint model for pedestrian re-recognition, and pedestrian recognition, and the eighth stage is divided into the following sub-steps:

Step 1: in order to prevent gradient explosion and vanishing in the training process of the joint model for pedestrian re-recognition, using a residual connection mode to accelerate model convergence, perform iterative training, and adjust training parameters, so as to obtain the joint model for pedestrian re-recognition; and Step 2: inputting the original surveillance video image test set into the joint model for pedestrian re-recognition trained in the Step 1 for prediction, and box-selecting pedestrians in the images, so as to realize pedestrian re-recognition.

Figure 6:
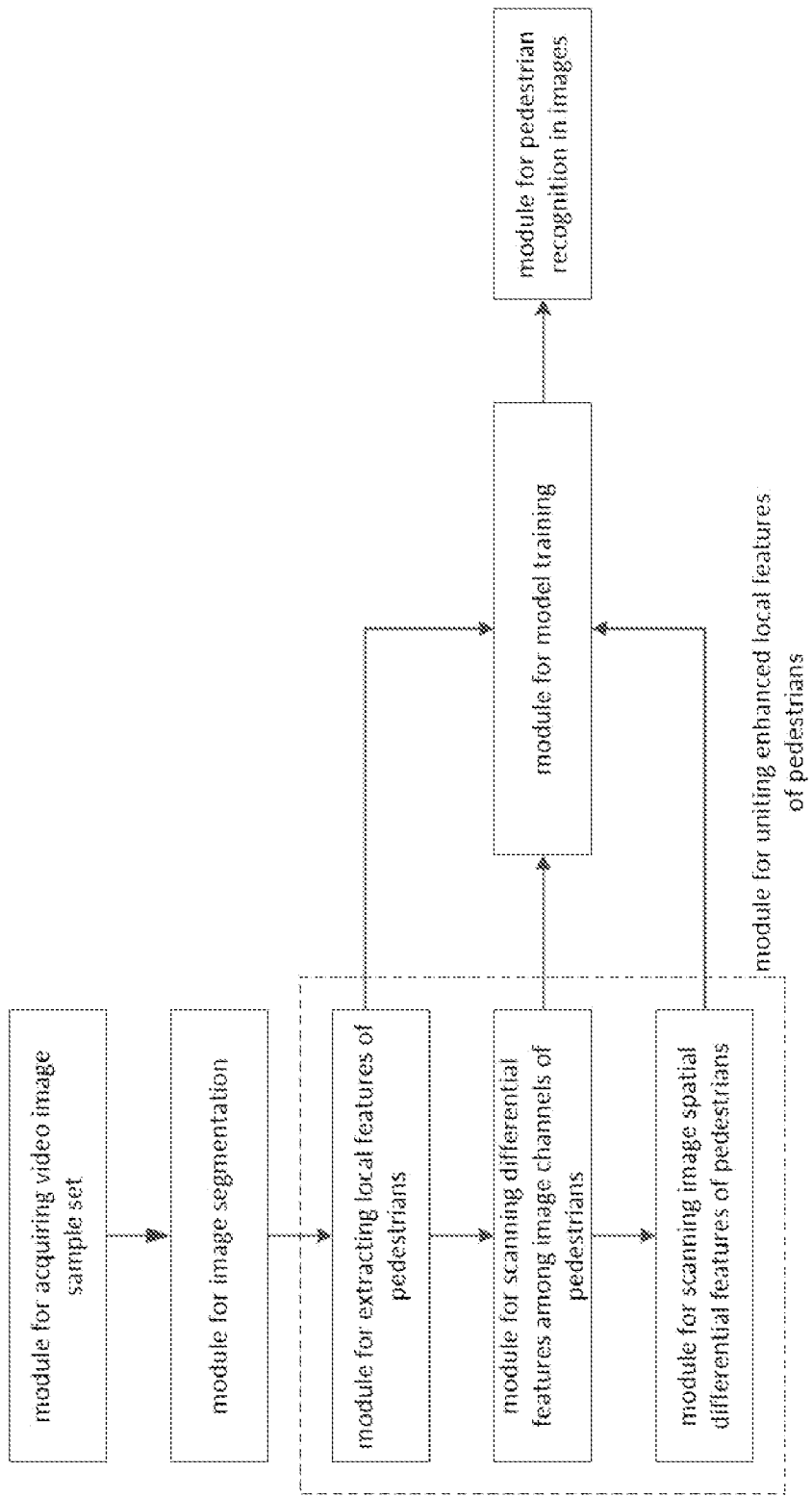
FIG. 6 is a schematic diagram of an apparatus of an embodiment of the present disclosure.

An embodiment of the present disclosure further provides a computer-implemented joint modeling apparatus for enhancing local features of pedestrians, as shown in FIG. 6, including the following modules: a module for acquiring a video image sample set, configured to acquire an original surveillance video image data set; a module for image segmentation, configured to obtain image blocks by performing image segmentation according to channels; a module for extracting local features of pedestrians, configured to construct a multi-head attention neural network to extract local image features of pedestrians; a module for capturing differential features among image channels of pedestrians, configured to construct an enhanced channel feature neural network to capture differential features among image channels of pedestrians by using a convolutional neural network; a module for scanning image spatial differential features of pedestrians, configured to construct an enhanced spatial feature neural network to scan image spatial differential features of pedestrians; a module for uniting enhanced local image features of pedestrians, configured to interactively concatenate the local features of pedestrians in the multi-head attention neural network, the differential features among image channels of pedestrians in the enhanced channel feature neural network, and the image spatial differential features of pedestrians in the enhanced spatial feature neural network, which are then jointly modeled; a module for pedestrian probability recognition (unshown), configured to construct a feed-forward neural network, where the enhanced local features of pedestrians go through linear transformation and are then mapped into a pedestrian probability output; a module for model training, configured to iteratively train the convolutional neural network and the multi-head attention neural network and update model parameters until the model training converges, so as to obtain a joint pedestrian recognition model; and a module for pedestrian recognition in images, configured to input a test set into the joint pedestrian recognition model to recognize pedestrians. In one example, the module for pedestrian probability recognition may be included in the module for model training.

Figure 7:
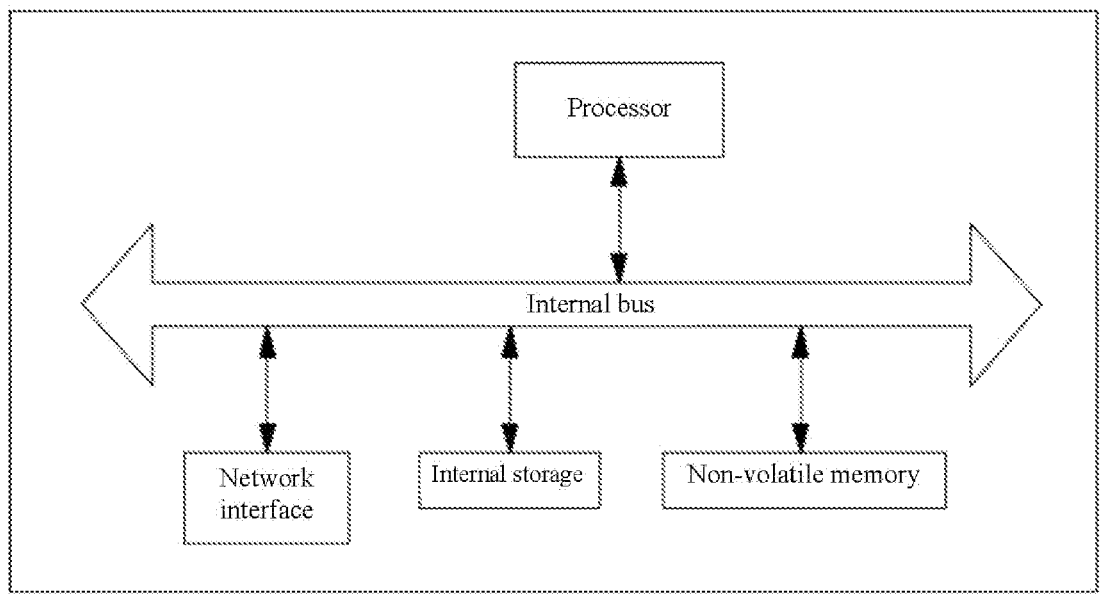
FIG. 7 is a schematic diagram of an intelligent pedestrian recognition system of an embodiment of the present disclosure.

Referring to FIG. 7, an embodiment of the present disclosure further provides an intelligent pedestrian recognition system, including a video image data inputting device (unshown), a joint modeling apparatus for enhancing local features of pedestrians, and a highlight display device (unshown), wherein the joint modeling apparatus for enhancing local features of pedestrians, r includes: a memory storing executable codes therein, and one or more processors that, when execute the executable codes, are configured to implement the joint modeling method for enhancing local features of pedestrians in the embodiment above. The video image data inputting device includes a camera for capturing video image data, the highlight display device is configured to highlight the recognized pedestrian by joint modeling apparatus for enhancing local features of pedestrians. The above processors may be implemented by various general-purpose processors or application specific processors. The camera may be a local camera or an internet camera.

The embodiment of the joint modeling apparatus for enhancing local features of pedestrians of the present disclosure may be applied to an arbitrary device capable of processing data, which may be a device or apparatus such as a computer. The embodiment of the apparatus may be implemented in software, or may be implemented in hardware or a combination of hardware and software. Taking software implementation as an example, the apparatus, as existing in a logical sense, is formed through reading corresponding computer program instructions in a non-volatile memory into an internal storage by a processor of the arbitrary device capable of processing data where the apparatus is located. From the hardware level and as shown in FIG. 7, which is a hardware structure diagram of the arbitrary device capable of processing data where the joint modeling apparatus for enhancing local features of pedestrians of the present disclosure is located, in addition to the processor, internal storage, network interface and non-volatile memory shown in FIG. 7, the arbitrary device capable of processing data where the apparatus is located in the embodiment may also include other hardware according to the actual functions of the arbitrary device capable of processing data, such as a camera, a highlight display device, which will not be described again. The implementation processes of functions and effects of units in the apparatus described above are specifically described in the implementation processes of corresponding steps in the method described above, which will not be described again.

With regard to the embodiments of the apparatus, which substantially correspond to the embodiment of the method, reference is made to the description of the embodiment of the method for associated parts. The embodiment of the apparatus described above is merely schematic, where the units illustrated as separate components may or may not be physically separated, and the components shown as units may or may not be physical units, i.e., they may be located in one place, or may be distributed over a plurality of network units. Some or all of the modules may be selected according to actual needs to achieve the objects of the solutions of the present disclosure. A person of ordinary skill in the art would have been able to understand and implement the disclosure without involving any inventive effort.

An embodiment of the present disclosure further provides a computer-readable storage medium storing a program thereon which, when executed by a processor, implements the joint modeling method for enhancing local features of pedestrians in the embodiment above.

The computer-readable storage medium may be an internal storage unit, such as a hard disk or an internal storage, of the arbitrary device capable of processing data of any of the preceding embodiments. The computer-readable storage medium may also be an external storage device of the arbitrary device capable of processing data, such as a plug-in hard disk, smart media card (SMC), SD card, flash card, etc., provided on the device. Further, the computer-readable storage medium may include both an internal storage unit and an external storage device of the arbitrary device capable of processing data. The computer-readable storage medium is configured to store the computer program and other programs and data required by the arbitrary device capable of processing data, and may also be configured to temporarily store data that has been or will be output.

While the above embodiments are merely preferred embodiments of the present disclosure, they are not intended to limit the present disclosure. Any modification, equivalent substitution or improvement made within the spirit and principle of the present disclosure shall be included in the scope of protection of the present disclosure.

What is claimed is:

1. A computer-implemented joint modeling method for enhancing local features of pedestrians, comprising the following steps:

S1: acquiring an original surveillance video image data set, dividing the original surveillance video image data set into a training set and a test set in proportion;

S2: cutting the surveillance video image training set to obtain image block vector sequences, specifically comprising:

S2.1: segmenting the surveillance video images on the basis of the number of channels of the images to obtain image blocks;

S2.2: converting the heights and widths of the image blocks into a fixed input size of the multi-head attention neural network; and S2.3: tiling the image blocks into sequences to obtain the image block vector sequences;

S3: constructing a multi-head attention neural network, inputting the image block vector sequences into the multi-head attention neural network and extracting the local image features of pedestrians;

S4: constructing an enhanced channel feature neural network, inputting the images into the enhanced channel feature neural network, and capturing differential features among image channels of pedestrians by using three-channel image convolution, specifically comprising:

S4.1: with regard to the three channels of the input images, constructing a three-channel enhanced image convolutional neural network which comprises three convolution kernels, wherein the three conventional kernels correspond to the three channels of the images, respectively;

S4.2: allowing the three convolution kernels to learn weight parameters of corresponding image channels respectively, and to output three groups of different weight parameters; and S4.3: allowing the three convolution kernels to calculate independently, and to learn differential parameter weights among the three channels, so as to obtain feature space maps of the three channels, and then calculating interactively to obtain image channel features of pedestrians;

S5: constructing an enhanced spatial feature neural network, inputting the images obtain image spatial differential features of pedestrians with scanning by using spatial convolution, specifically comprising:

S5.1: defining a two-dimensional convolution, spatially dividing the two-dimensional convolution into two sub-convolution kernels; and S5.2: scanning image spatial features respectively by using the two sub-convolution kernels, so as to obtain two spatial features, then obtaining the image spatial differential features of pedestrians by matrix multiplied;

S6: interactively concatenating the local image features of pedestrians in the multi-head attention neural network, the differential features among image channels of pedestrians in the enhanced channel feature neural network, and the image spatial differential features of pedestrians in the enhanced spatial feature neural network, constructing a joint model to enhance the local image features of pedestrians, specifically comprising:

S6.1: an interactive concatenation of the enhanced channel feature neural network and the multi-head attention neural network: firstly, the output of the convolutional network going through a global average pooling layer, using a first-layer three-channel convolution to learn weight parameters among the image channels, using a second-layer three-channel convolution to transform dimensionality after undergoing a first-layer activation function, and finally converting feature values into probability distribution through the activation function and inputting the probability distribution into the multi-head self-attention branch for calculation;

S6.2: an interactive concatenation of the multi-head attention neural network and the enhanced channel feature neural network: the output of the calculation for multi-head attention going through the first-layer three-channel convolution, learning different weight parameters among the three channels, converting the number of channels of the images into one, going through the second-layer three-channel convolution after undergoing the first-layer activation function, reducing the learned weight parameters, undergoing a second-layer activation function to become probability distribution in a spatial dimension, which is used as the output in the enhanced channel feature convolutional network branch;

S6.3S63: an interactive concatenation of the enhanced spatial feature neural network and the enhanced channel feature neural network: the two sub-convolutions of the two-dimensional convolution of the enhanced spatial feature neural network outputting a multi-dimensional convolutional spatial feature matrix of pedestrians, which is converted into a two-dimensional spatial feature matrix that, after undergoing matrix multiplication and activation function, is used as the output of the enhanced channel feature neural network; and S6.4: inputting the output of multi-head attention, the output of enhanced channel feature convolution and the output of spatial convolution into a multi-layer perceptron, wherein the local image features of pedestrians are mapped to parallel branches through the linear layer to conduct feature fusion calculation, so as to obtain the enhanced local image features of pedestrians;

S7: inputting the enhanced local image features of pedestrians into a feed-forward neural network to recognize pedestrians in the images; and S8: iteratively training the neural network obtained by joint modeling to obtain a joint model for pedestrian re-recognition and recognize the pedestrians.

2. The joint modeling method for enhancing local features of pedestrians according to claim 1, wherein in the step S1, the original surveillance video image data set comprises an image labeled sample, a coordinate file of the image labeled sample, and an unlabeled sample.

3. The joint modeling method for enhancing local features of pedestrians according to claim 1, wherein the lengths of the image block vector sequences are equal to the sizes multiplied by the heights multiplied by the widths of the images, the image block vector sequences contain position coordinates of the image blocks, and the sequences are converted into matrices, which are used as inputs to the multi-head attention neural network.

4. The joint modeling method for enhancing local features of pedestrians according to claim 1, wherein the step S3 comprises the following sub-steps:

S3.1: calculating a single attention: with regard to a query matrix, a key matrix and a value matrix present in each of the image block vector sequences in the step S3, obtaining an attention score matrix by matrix multiplying the query matrix and the key matrix, applying the attention score matrix to the value matrix, after matrix multiplication of the two matrices, obtaining the single attention through an activation function;

S3.2: constructing a multi-head attention: with regard to the image block vector sequences, calculating a single attention from each of the image block vector sequences respectively, and conducting interactive calculation on the single attentions calculated from each of the image block vector sequences to obtain the multi-head attention; and S3.3: extracting local image features of pedestrians by using the multi-head attention: inputting the image block vector sequences into the constructed multi-head attention neural network, calculating local self-attention of pixels of each of the images to the pixels of adjacent images by using a local multi-head self-attention mechanism, and extracting the local image features of pedestrians through parallel matrix multiplication.

5. The joint modeling method for enhancing local features of pedestrians according to claim 1, wherein the step S7 comprises the following sub-steps:

S7.1: adopting the feed-forward neural network and the activation function, inputting the obtained enhanced local image features of pedestrians into the feed-forward neural network, allowing it to go through linear layer transformation, and mapping the probability distribution of pedestrians into categories to recognize pedestrians by using the activation function; and S7.2: calculating an intersection ratio of coordinates of the recognized pedestrians and the image labeled sample in the original surveillance video image data set, and calculating an accuracy rate and a recall rate, wherein the accuracy rate refers to the recognized pedestrians, indicating a proportion of real pedestrians in the sample predicted to be positive, and the recall rate refers to the image labeled sample in the original surveillance video image data set, indicating a proportion of correctly recognized pedestrians in the positive examples in the sample.

6. The joint modeling method for enhancing local features of pedestrians according to claim 1, wherein the step S8 comprises the following sub-steps:

S8.1: using a residual connection mode for the neural network obtained by joint modeling to accelerate model convergence, perform iterative training, and adjust training parameters, so as to obtain the joint model for pedestrian re-recognition; and S8.2: inputting the original surveillance video image test set into the joint model for pedestrian re-recognition trained in the step S8.1 for prediction, and box-selecting pedestrians in the images, so as to realize pedestrian re-recognition.

7. A computer-implemented joint modeling apparatus for enhancing local features of pedestrians, comprising the following modules:
- a module for acquiring a video image sample set, configured to acquire an original surveillance video image data set;
- a module for image segmentation, configured to obtain image blocks by performing image segmentation according to channels;
- a module for extracting local features of pedestrians, configured to construct a multi-head attention neural network to extract local features of pedestrians;
- a module for capturing differential features among image channels of pedestrians, configured to construct an enhanced channel feature neural network to capture differential features among image channels of pedestrians by using a convolutional neural network;
- a module for scanning image spatial differential features of pedestrians, configured to construct an enhanced spatial feature neural network to scan image spatial differential features of pedestrians;
- a module for uniting enhanced local features of pedestrians, configured to interactively concatenate the local features of pedestrians in the multi-head attention neural network, the differential features among image channels of pedestrians in the enhanced channel feature neural network, and the image spatial differential features of pedestrians in the enhanced spatial feature neural network, which are then jointly modeled;
- a module for pedestrian probability recognition, configured to construct a feed-forward neural network, wherein the enhanced local image features of pedestrians go through linear transformation and are then mapped into a pedestrian probability output;
- a module for model training, configured to iteratively train the neural network obtained by joint modeling and update model parameters until the model training converges, so as to obtain a joint pedestrian recognition model; and
- a module for pedestrian recognition in images, configured to input a test set into the joint pedestrian recognition model to recognize pedestrians.

* * * * *